United States Patent [19]

Itoh et al.

[11] Patent Number: 4,789,890

[45] Date of Patent: Dec. 6, 1988

[54] JUDGEMENT CIRCUIT AND ADAPTIVE FILTER INCORPORATING THE SAME

[75] Inventors: Hiroshi Itoh; Tadashi Kasezawa; Yoshiki Mizutani, all of Nagaokakyo, Japan

[73] Assignee: Mitsubishi Denki Kabushiki Kaisha, Tokyo, Japan

[21] Appl. No.: 937,045

[22] Filed: Dec. 2, 1986

[30] Foreign Application Priority Data

Dec. 5, 1985 [JP] Japan ................................ 60-274737
Mar. 7, 1986 [JP] Japan .................................. 61-50807

[51] Int. Cl.[4] ............................................. H04N 9/78
[52] U.S. Cl. .................................... 358/31; 358/37
[58] Field of Search ........................... 358/31, 37

[56] References Cited

U.S. PATENT DOCUMENTS

| | | | |
|---|---|---|---|
| 4,141,035 | 2/1979 | Maxemchuk et al. | 358/31 |
| 4,232,330 | 11/1980 | Heitmann | 358/31 |
| 4,240,105 | 12/1980 | Farondja | 358/31 |
| 4,352,122 | 9/1982 | Reitmeier et al. | 358/11 |
| 4,399,454 | 8/1986 | Warnock et al. | 358/16 |
| 4,464,686 | 8/1984 | Reitmeier | 358/314 |
| 4,626,895 | 12/1986 | Reitmeier | 358/31 |

FOREIGN PATENT DOCUMENTS

| | | | |
|---|---|---|---|
| 149214 | 7/1985 | European Pat. Off. | 358/31 |
| 153034 | 8/1985 | European Pat. Off. | 358/31 |
| 123280 | 9/1980 | Japan . | |
| 5454795 | 9/1981 | Japan . | |
| 129891 | 3/1983 | Japan . | |
| 129890 | 8/1983 | Japan | 358/31 |
| 23973 | 2/1984 | Japan | 358/31 |
| 139090 | 7/1985 | Japan | 358/31 |

OTHER PUBLICATIONS

Takashi Okada et al., "New Filter Technology in Picture Processing", Sony Corp., New Filter Technology in Picture Processng, pp. 157-167 (6/82).

J. P. Rossi, "Sub-Nyquist-Encoded PCM NTSC Color Television", SMPTE Journal, vol. 85, No. 1, pp. 1-6 (1976).

Nakagawa et al., Shinichi, "Adaptive YC Separation Digital Filter", 1984 National Convention Record of Institute of Electronics and Communication Engineers of Japan.

Kasezawa, Tadashi, "Adaptive YC Separation Digital Filter System", 1984 National Convention Record of Television Inst. of Japan, pp. 357 and 358.

Rossi, "Digital TV Comb Filter with Adaptive Feature", IEEE Conf. Proc. pp. 267-282 (1976).

Rossi, J. SMPTE, 84:545-551 (1975), "Digital Television Image Enhancement".

Primary Examiner—John W. Shepperd
Attorney, Agent, or Firm—Saidman, Sterne Kessler & Goldstein

[57] ABSTRACT

In a judgement circuit for an adaptive filter for use in a color television system, sample values of a composite video signal are obtained by sampling the composite video signal at a predetermined sampling frequency in synchronism with a horizontal scanning frequency in such a manner that the corresponding sample points are arranged in a grating on the screen. A horizontal filter receives the sample values corresponding to a first sample point and a second and a third sample points positioned at the left of and at the right of the first sample point. A vertical filter receives the sample values corresponding to the first sample point and a fourth and a fifth sample points positioned over and under the first sample point. The variation of the signal in the vertical direction and the variation of the signal in the vertical direction are detected, and are compared. One of the output of the horizontal filter and the output of the vertical filter is selected in accordance with the result of the comparison.

8 Claims, 13 Drawing Sheets

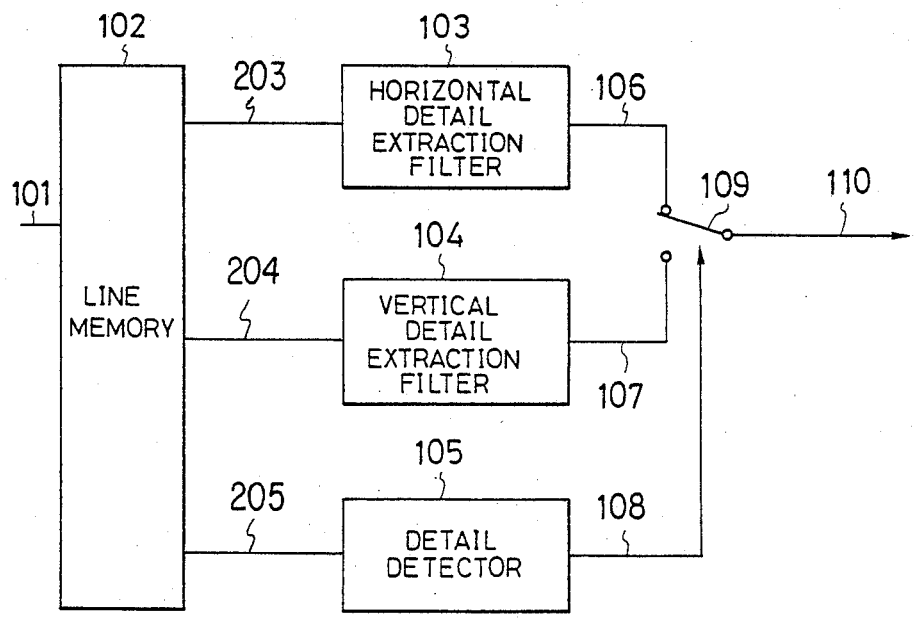

JUDGEMENT CIRCUIT AND ADAPTIVE FILTER INCORPORATING THE SAME

BACKGROUND OF THE INVENTION

The present invention relates to a judgement circuit for use in an adaptive filter, such as an adaptive luminance signal/chrominance signal separation filter, particularly one for separating a luminance signal and a chrominance signal from a composite television signal of the NTSC system. The judgment circuit may also be incorporated in a digital detail extraction filter that extracts details directly from an NTSC video signal with frequency-multiplexed luminance and chrominance signals.

In a prior art luminance signal/chrominance signal separation filter, the characteristics of the vertical direction filter and the horizontal filter are fixed and combined. Moreover, an assumption has been made that the picture elements forming a series of samples of the television signal which are adjacent to each other are analogous to each other. With such an arrangement, in the region where there is a sharp change in the luminance and chrominance of the picture, the luminance signal component and the chrominance signal component of each channel (line) intrude into the adjacent channel (line), causing cross coloring and dot interference thereby to deteriorate the quality of the reproduced picture.

Prior art detail extraction filters use only components of the luminance signal. This requires separate 1H delay circuit: one to delay the signal by one horizontal scan period in the luminance/chrominance separation circuit that separates the video signal into a luminance signal and chrominance signal, and another for the horizontal and vertical detail extraction filter.

SUMMARY OF THE INVENTION

An object of the invention is to eliminate the above-described problems.

Another object of the invention is to provide an adaptive luminance signal/chrominance signal separation filter which can achieve accurate separation of the luminance signal and chrominance signal even where there is a sharp variation in the signal of the television picture.

Another object of this invention is to provide a detail extraction filter in which the 1H and 2H delay lines can be shared with the luminance/chrominacce separation circult.

According to one aspect of the invention, there is provided a judgement circuit for an adaptive filter for use in a color television system comprising means providing sample values of a composite video signal obtained by sampling the composite video signal at a predetermined sampling frequency in synchronism with a horizontal scanning frequency in such a manner that the corresponding sample points are arranged in a grating on the screen, horizontal filter means receiving sample values corresponding to a first sample point and a second and a third sample points positioned at the left of and at the right of the first sample point, vertical filter means receiving sample values corresponding to the first sample point and a fourth and a fifth sample points positioned over and under the first sample point, means for detecting the variation of the signal in the vertical direction, means for detecting the variation of the signal in the horizontal direction, and comparator means for comparing the variation of the signal in the vertical direction and the variation of the signal in the horizontal direction, and means for selecting one of the output of the horizontal filter means and the output of the vertical filter means in accordance with the result of the comparison.

According to another aspect of the invention, there is provided a luminance signal/chrominance signal separation filter receiving sample values obtained by sampling a composite video signal at a predetermined sampling frequency in synchronism with a horizontal scanning frequency in such a manner that the corresponding sample points are arranged in a grating on the screen, and digitally separating the luminance signal component and the chrominance signal component, and comprising:

delay means for delaying the sample values for concurrently producing a sample value corresponding a first sample point which is being subjected to the separation of the luminance signal and the chrominance signal, sample values corresponding to a second and a third sample points positioned on the same scanning line and at the left of and at the right of the first sample point and being identical in the phase of the color subcarrier and sample values corresponding to a fourth and a fifth sample points positioned over and under the first sample point and being identical in the phase of the color subcarrier, a separation horizontal direction filter for the separation of the luminance signal and the chrominance signal receiving the sample values corresponding to the first sample point and the second and the third sample points, and extracting the frequency component corresponding to the color subcarrier component from the series of the signal values in the horizontal vertical direction on the screen, a separation vertical direction filter for the separation of the luminance signal and the chrominance signal receiving the sample values corresponding to the first sample point and the fourth and the fifth sample points, and extracting the frequency component corresponding to the color subcarrier component from the series of the signal values in the vertical direction on the screen, a first judgment horizontal direction filter for receiving the sample value corresponding to the first sample point and the sample values corresponding to the second and the third sample points and extracting the frequency component corresponding to the color subcarrier component from the series of the signal values along the horizontal direction on the screen, a first judgement vertical direction filter for receiving the sample value corresponding to the first sample point and the sample values corresponding to the forth and the fifth sample points and extracting the frequency component corresponding to the color subcarrier component from the series of the signal values along the vertical direction on the screen, a second judgement horizontal direction filter for receiving the sample values corresponding to the second and the third sample points and extracting the frequency component corresponding to $\frac{1}{2}$ of the color subcarrier component from the series of the signal values along the horizontal direction on the screen, a second judgement vertical direction filter for receiving the sample values corresponding to the fourth and the fifth sample points and extracting the frequency component corresponding to ½ of the color subcarrier component from the series of the signal values along the vertical direction on the screen, horizontal direction high band energy detecting means for adding, in a predetermined ratio, the outputs of the first and the second judgement horizontal direction filters, thereby to extract a high frequency component along the horizontal direction on the screen, vertical direction high band energy detecting means for adding, in a predetermined ratio, the outputs of the first and the second judgement vertical direction filters, thereby to extract a frequency component along the vertical direction on the screen, comparison means for comparing the results of the detection by the energy detecting means, a switch circuit for selecting the output of the separation horizontal direction filter, when the comparison means finds that the high frequency component as detected by the horizontal direction high band energy detecting means is smaller than the high frequency component as detected by the vertical direction high band energy detecting means, and for selecting the output of the separation vertical direction filter, when the comparison means finds that the high frequency component as detected by the horizontal direction high band energy detecting means is not smaller than the high frequency component as detected by the vertical direction high band energy detecting means, the selected one of the outputs constituting the chrominance signal component, and an operation circuit for subtracting the output of the switch circuit from the composite video signal to produce the luminance signal component.

With the above arrangement, the separation of the luminance signal and the chrominance signal is made using either the series of the signal values representing the waveform along the vertical direction or the series of the signal vales along the horizontal direction, which varies more slowly. Accordingly, the cross color disturbance and the dot disturbance can be reduced.

According to a further aspect of the invention, there is provided a detail extraction filter for extraction by digital means of the detail component of a given NTSC video signal smpled at four times the frequency of the color subcarrier, the extraction filter comprising:

a line memory including a plurality of delay means for delaying said video signal by one horizontal scan period;

a vertical detail extraction filter for extracting the detail signal in the vertical direction on the screen, said vertical detail extraction filter including a first comb filter receiving the output of said line memory and outputting the high-frequency component in the vertical direction in the picture, and a low-pass filter including a plurality of delay means receiving and delaying the output of said first comb filter by two sampling periods, and outputting the low-frequency component in the horizontal direction on the screen;

a horizontal detail extraction filter for extracting the detail signal in the horizontal direction in the screen, said horizontal detail extraction filter including a second comb filter receiving the output of said line memory and outputting the low-frequency component in the vertical direction on the screen, and a high-pass filter including a plurality of delay mens receiving and delaying the output of said second comb filter by two sampling periods, and outputting the high-frequency component in the horizontal direction on the screen;

a detail detector circuit including delay means receiving and delaying the output of said line memory by two sampling period, said detail detector circuit determining the degree of variation in the signal in the horizontal and vertical directions to detect the direcion of the profile; and selecting means for selectively passing either the output of said vertical detail extraction filter or the output of said horizontal detail extraction filter in response to the output of said detail detector circuit;

said detail detector circuit comprising for both the horizontal and vertical directions, a first bandpass filter for extracting frequency components corresponding to the color subcarrier frequency, a second bandpass filter for extracting frequency components corresponding to one-half the color subcarrier frequency, and adder means for summing the outputs of the said first and second bandpass filters in a predetermined ratio, said detail detector circuit thereby extracting the degree of variation of the high-frequency componens in said horizontal and vertical directions to detect the direction of the detail.

With the above arrangement, the horizontal detail extraction filter extracts the horizontal detail signal directly from the video signal, the vertical detail extraction filter extracts the vertical detail signal directly from the video signal, and the detail detection circuit determines from the features of the video signal whether a detail is present in the horizontal or vertical direction and controls the output circuit. Contamination of the detail signal by the chrominance signal is prevented because the detail detector circuit detects detail direction by detecting transitions in the strength of high-frequency components in the horizontal and vertical directions.

BRIEF DESCRIPTION OF THE DRAWINGS

In the accompanying drawings:

FIG. 6 shows an arrangement, on the screen, of the series of signals obtained by sampling a composite color TV signal of the NTSC signal at a frequency four time the frequency of the color subcarrier;

FIG. 7 is a block diagram showing an adaptive detail extraction filter of another embodiment of the invention;

DETAILED DESCRIPTION OF THE PREFERRED EMBODIMENTS

The invention will now be described in the form in which a judgement circuit is incorporated in an adaptive luminance single/chrominance signal separation filter, and then in the form in which a judgement circuit is incorporated in a detail extraction filter.

Before describing the respective embodiments of the invention, prior art luminance signal/chrominance signal separation filter and the detail extraction filter will be discussed in further detail.

Prior Art Luminance Signal/Chrominance Signal Separation Filter

Figure 5:
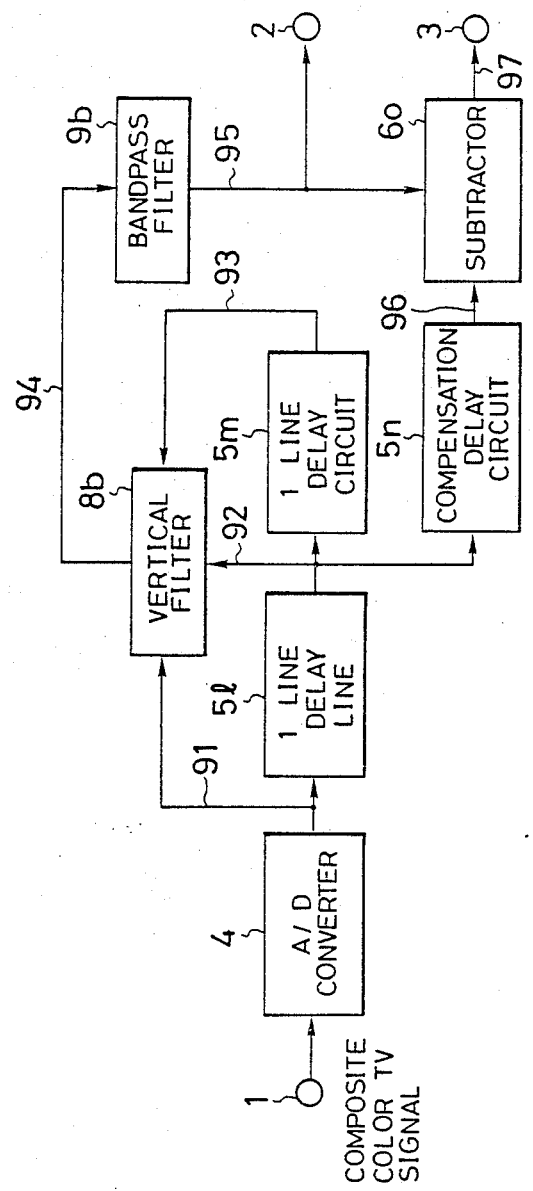
FIG. 5 is a block diagram showing an example of conventional luminance signal/chrominance signal separation filter.

FIG. 5 shows an example of a conventional luminance signal/chrominance signal separation filter. A composite color television signal of the NTSC type is input to an input terminal 1. The composite color television signal is passed through an A/D (analog-to-digital) converter 4 to a vertical direction filter 8b, as well as to a 1-line delay line 51. The output of the 1-line delay line 51 is also applied to a vertical direction filter 8b. It is also passed through another 1-line delay line 5m where it is delayed by a further 1-line, and is then applied to the vertical direction filter 8b. The vertical direction filter 8b is usually a 2-line comb filter, and is then applied to a bandpass filter 9b. The output of the bandpass filter 9b, forming a color signal 95, is output through an output terminal 2 and is also applied to a first input of a subtractor 6o. The output of the 1-line delay line 51 is passed through a compensation delay line 5n to a second input of the subtractor 6o. The compensation delay line 5n is for compensating the delay in the bandpass filter 9b. The subtractor 6o produces a luminance signal 97, which is output through an output terminal 3.

The operation of the above-described filter is now described.

The A/D converter 4 samples, in synchronism with a color subcarrier at a sampling frequency $f_s=4 f_{sc}$ ($f_{sc}$ being the frequency of the color subcarrier) to produce a series of sample values of the composite coler TV signal 91, which correspond to points on a screen having a two-dimensional arrangement in a grating format as shown in FIG. 6, since $f_{sc}=(455/2) f_H$, $f_H$ being the horizontal scanning frequency, the sampling frequency $f_s$ is given by:

$$f_s = 4 f_{sc}$$
$$= 4 (455/2) f_H$$

The samples 91 represent the instantaneous values of the composite color television signal, with its chrominance signal C being 180 phase-shifted or inverted at alternate lines, which is sampled 4 times per period of the color subcarrier. In FIG. 6, Y represents a luminance signal, while C1 and C2 represent chrominance signals. The delay by 1 sample and the delay by 1 line can be expressed using Z transform:

$Z^{-1}$ an $Z^{-1}$.

Here, $$Z^{-1} = \exp(-j2\pi f/4f_{sc}).$$

Since $f_{sc} = (455/2) \cdot f_H$, $1 = 910$. The vertical direction filter 8b, receiving the 1-line delayed signal 92 from the 1-line delay line 51 and the 2-line delayed signal 93 from the 1-line delay line 5m, as well as the current input signal 201, produces or extracts a line enhancement signal 94 which enhances or aids each line including the chrominance signal. The transfer function Hv(Z) of the vertical direction filter 8b is given by:

$$H_v(Z) = -\tfrac{1}{4}(1-Z^{-1})^2$$

That is, assuming that the television signal is analogous between adjacent picture elements, the line enhancement signal Hc (m,n) at the coordinate (m,n) in FIG. 6 is given (or extracted as)

$$Hc(m,n) = -\tfrac{1}{4}\{S(m,n-1) - 2S(m,n) + S(m,n+1)\}.$$

The line enhancement signal contains the luminance signal Y as well, so that bandpass filter 9b is used to separate from the line enhancement signal Hc (m,n) the chrominance signal C (m,n,) which is a high frequency component. The chrominance signal 95 thus obtained is supplied to the subtractor 6o. The subtractor 6o subtracts the chrominance signal C(m,n) 95 from a signal S (m,n) from the compensation delay line 5n, which delays the 1-line delay signal 92, to compensate the delay by the bandpass filter 9b, as described before. As a result, the luminance signal Y(m,n) 97 is separated: as follows:

$$Y(m,n) = S(m,n) - C(m,n)$$

The bandpass filter 9b may have the transfer function Hh (Z), $$Hh(Z) = -1/32 \cdot (1-Z^{-2})^2 (1+Z^{-4})^2 (1+z^{-3})$$

With the above-described arrangement, the characteristics of the vertical direction filter and the horizontal filter are fixed and combined. Moreover, an assumption has been made that the picture elements forming a series of samples of the television signal which are adjacent to each other are analogous to each other. Therefore, with the conventional system, in the region where there is a sharp change in the luminance and chrominance of the picture, the luminance signal component and the chrominance signal component of each channel (line) intrude or leaked into the adjacent channel (line), causing cross coloring and dot interferences thereby to deteriorate the quality of the reproduced picture.

Luminance Signal/Chrominance Signal Separation Filter of an Embodiment

Figure 1:
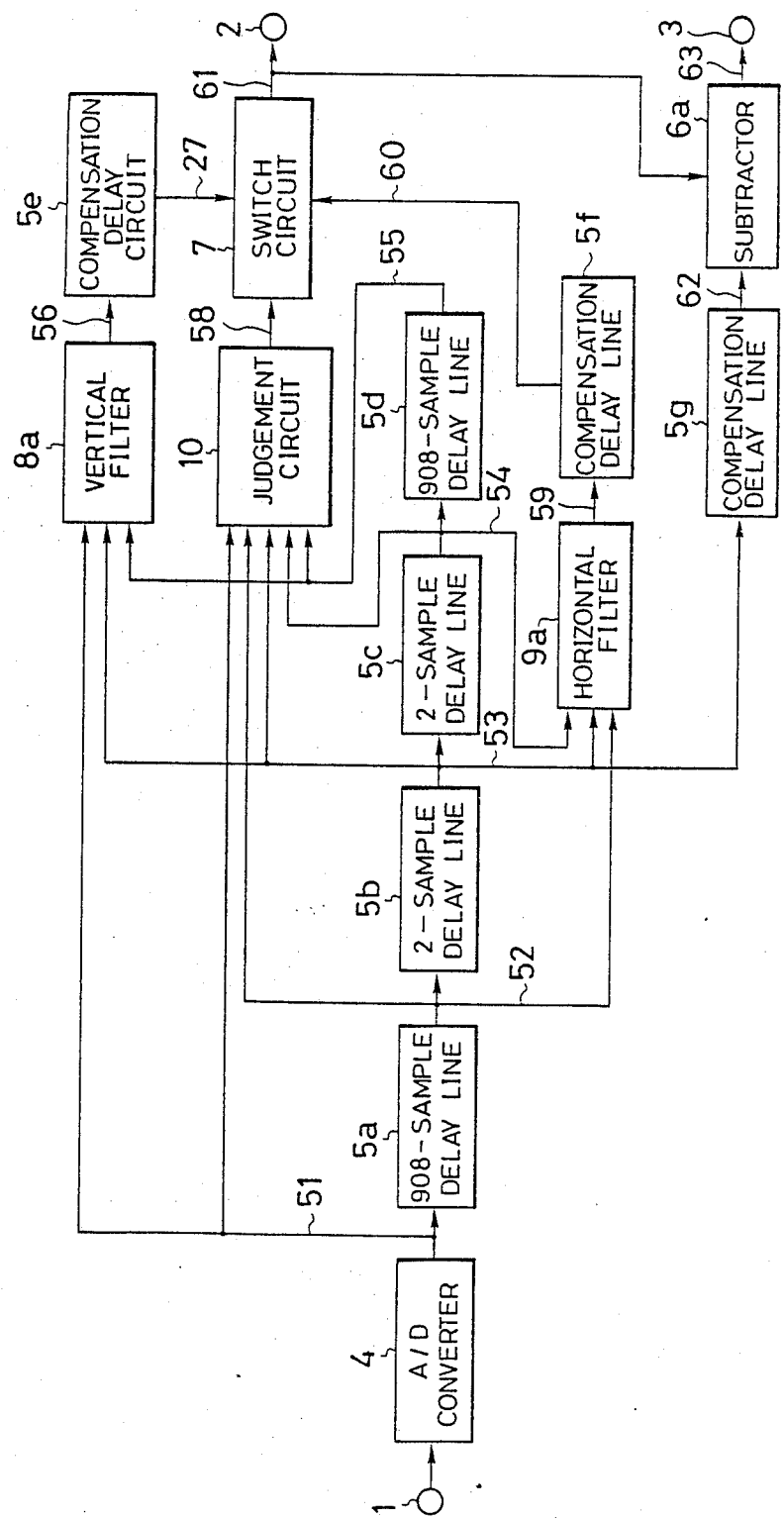
FIG. 1 is a block diagram showing an example of an adaptive luminance signal/chrominance signal separation filter of an embodiment of the invention.

FIG. 1 is a block diagram showing an embodiment of the invention. A composite color television signal of the NTSC type is input to an input terminal 1. The composite color television signal is applied to an A/D converter 4, The A/D converter 4 samples the composite color television signal at a sampling frequency $f_s=4 \cdot f_{sc}$. The sample value signals obtained by the A/D converter 4 are passed through a 908-sample delay line 5a, a 2-sample delay line 5b, a 2-sample delay line 5c and a 908 sample delay line 5d in turn. The outputs 51 through 55 of the A/D converter 4 and the delay lines 5a through 5d are all supplied to a judgement circuit 10. The 908-sample delay lines 5a and 5d are for delaying the sample value signals by 908 sampling periods, with the 1 sampling period being $1/(4f_{sc})$ sec. Similarly, the 2-sample delay lines 5b and 5c are for delaying the sample value signals by 2 sampling periods. By the use of the delay lines, a sample value of a sample point in question (hereinafter referred to as a first sample point), and sample values of sample points positioned above, below, at the right of and at the left of the first sample point are extracted concurrently.

A vertical direction filter 8a is connected to receive the output 51 of the A/D converter 4 and the outputs 53 and 55 of the delay lines 5b and 5d. The output 56 of the vertical direction filter 8a is passed through a compensation delay line 5c to a switch circuit 7. The compensation delay line 5c is for compensating the delay by the judgement circuit 10.

A horizontal direction filter 9a is connected to receive the outputs 52 through 54 of the delay lines 5a through 5c. The output 59 of the horizontal direction filter 9a is passed through a compensation delay line 5f to the switch circuit 7. The compensation delay line 5f is for compensating the delay by the judgement circuit 10.

The judgement circuit 10, receiving the outputs 51 through 55 of the A/D converter 4 and the delay lines 5a through 5d, are for making judgement as to the selection between the vertical direction filter 8a and the horizontal direction filter 9a. The output 58 of the judgement circuit 10 is applied to the switch circuit 7. The output 61 of the switch circuit 7, forming the chrominance signal, is output through an output terminal 2. The output 61 is also applied to a first input of a subtractor 6a. A second input of the subtractor 6a is connected to receive the output 53 of the delay line 5b, through a compensation delay line 5g. The compensation delay line 5g is for compensating the delay caused when the chrominance signal separation is made. The subtractor 6a produces a luminance signal, which is output through an output terminal 3.

Figure 2:
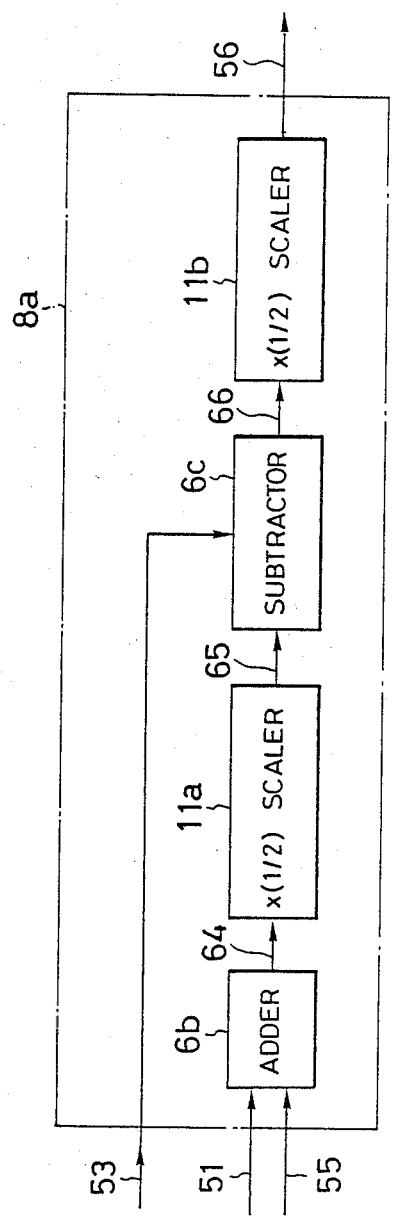
FIG. 2 is a block diagram showing an example of a vertical direction filter.

FIG. 2 shows an example of the vertical direction filter 8a. The output 51 of the A/D converter 4 and the output 55 of the delay line 5d are applied to an adder 6b, whose output 54 is passed through a x($\frac{1}{2}$) scaler 11a to a first input of a subtractor 6c. A second input of the subtractor 6c is connected to receive the output 53 of the delay line 5b. The output 66 of the subtractor 6c is passed through another x($\frac{1}{2}$) scaler 11b, and is output as the output 56 of the vertical direction filter.

Figure 3:
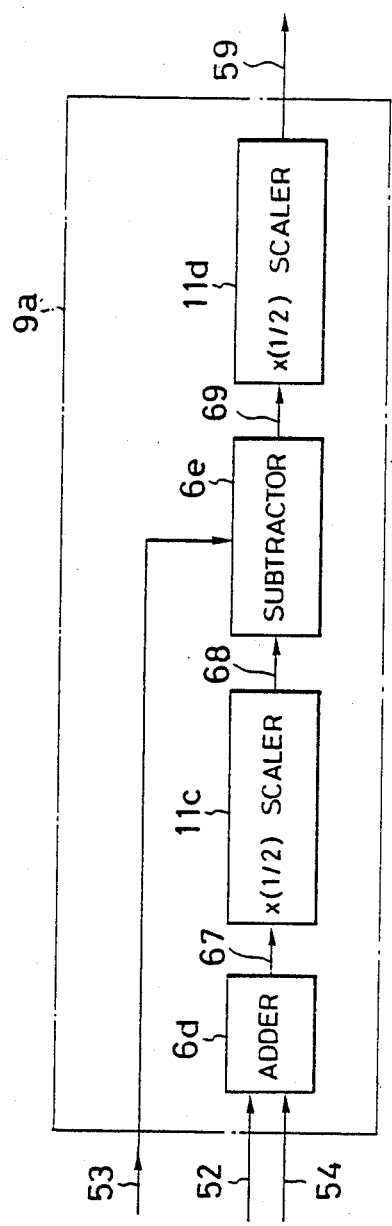
FIG. 3 is a block diagram showing an example of a horizontal direction filter.

FIG. 3 shows an example of the horizontal direction filter 9a. The outputs 52 and 54 of the delay lines 5a and 5c are applied to an adder 6d, whose output is passed through a x($\frac{1}{2}$) scaler 11c to a first input of a subtractor 6e. A second input of the subtractor 6e is connected to receive the output 53 of the delay line 5b. The output 69 of the subtractor 6e is passed through another x($\frac{1}{2}$) scaler 11d and is then output as the output 59 of the horizontal direction filter.

Figure 4:
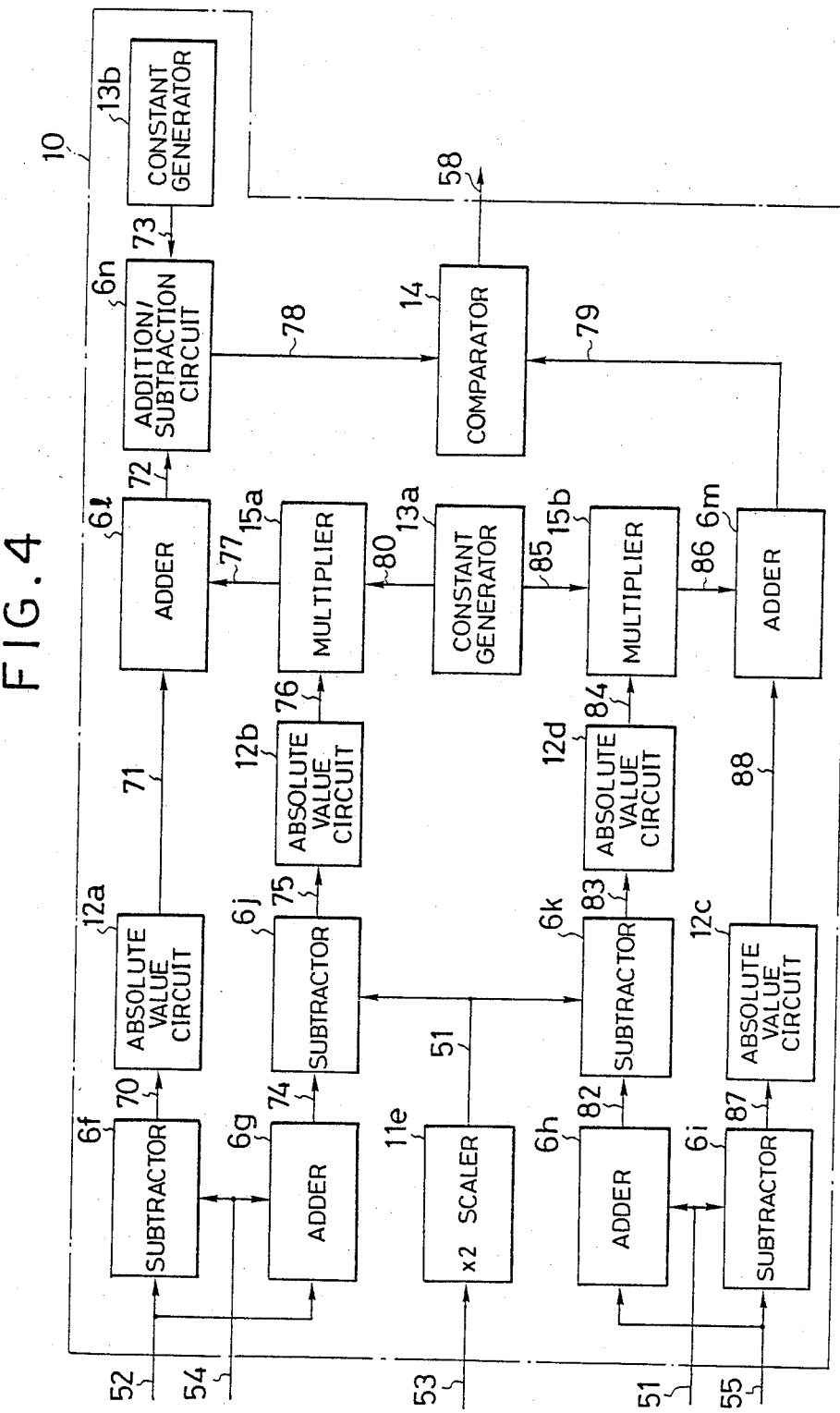
FIG. 4 is a block diagram showing a judgement circuit.

FIG. 4 shows an example of the judgement circuit 10. The outputs 52 and 54 of the delay lines 5a and 5c are respectively applied to first and second inputs of the subtractor 6f and the adder 6g. The output 53 of the delay line 5b is passed through a x2 scaler 11e to a first input of a subtractor 6j. A second input of the subtractor 6j is connected to receive the output of the adder 6g. The outputs 70 and 75 of the subtractors 6f and 6j are passed through absolute value circuits 12a and 12b, respectively, to a first input of an adder 61 and a first input of a multiplier 15a. A second input of the adder 61 is connected to receive the output 77 of the multiplier 15a. A second input of the multiplier 15a is connected to receive an output 80 of a constant generator 13a. The multiplier 15a may comprise a shift register, for example, thereby to simplify the construction. The output 72 of the adder 61 is applied to a first input of an addition/subtraction circuit 6n. A second input of the addition/subtraction circuit 6n is connected to receive the output 73 of a constant generator 13b. The output 78 of the addition/subtraction circuit 6n is applied to a first input of a comparator 14.

The adder 6g, the subtractor 6j and the x2 scaler 11e in combination form a first judgement horizontal direction filter. The subtractor 6f forms a second judgement horizontal direction filter. The adder 61 and the multiplier 15a form in combination a horizontal high band energy detecting means.

The output 51 of the A/D converter 4 and the output 55 of the delay line 5d are respectively applied to a first and a second inputs of the adder 6h and the subtractor 6i. The output 82 of the adder 6h is applied to a first input of a subtractor 6k. A second input of the subtractor 6k is connected to receive the output 81 of a x2 scaler 11e. The output 83 of the subtractor 6k is passed through an absolute value circuit 12d to a first input of a multiplier 15b. A second input of the multiplier 15b is connected to receive an output 85 of a constant generator 13a. The output 86 of the multiplier 15b is applied to a first input of an adder 6m. A second input of the adder 6m is connected to receive an output 87 of the subtractor 6i through an absolute value circuit 12c. The output of the adder 6m is applied to a second input of the comparator 14.

The adder 6h, the subtractor 6k and the x2 scaler 11e in combination form a first judgement vertical direction filter. The subtractor 6i forms a second judgement vertical direction filter. The adder 6m and the multiplier 15b form a vertical high band energy detecting means.

The output of the comparator 14 constitutes the output 58 of the judgement circuit.

The operation will now be described.

The series of sample value signals 51 obtained by sampling the composite color television signal, at a sampling frequency of $f_s=4 f_{sc}$ by the A/D converter 4 are passed through the delay lines 5a through 5d. As a result, sample values of five sample points, one being the sample point in question (hereinafter referred to as a first sample point) and the remaining four being positioned over, under, at the right of and at the left of the first sample point so that the five sample points form a diamond shaped grating, are concurrently obtained. As shown in FIG. 6, if the coordinate of the first sample point on the screen is given by (m,n), the coordinates of the sample points over and under the first sample point are (m,n−1) and (m,n+1), respectively. The coordinates of the sample points at the left and at the right of the first sample point and two samples away from the first sample point are (m−2,n) and (m+2,n), respectively. When the sample value of the composite color television signal for the coordinate (m,n) appears at the signal line 53, the signals S (m,n−1), S (m,n+1), S (m−2,n), and S (m+2,n) for the coordinates (m,n−1), (m,n+1), (m−2,n), and (m+2,n) concurrently appear at the signal lines 55, 51, 54 and 52, respectively. As the sample values of the composite color television signal for the coordinates (m,n−1), (m,n+1), (m−2,n) and (m+2,n) have a color subcarrier of a phase 180° different from the phase of the color subcarrier which the sample value of the first sample point of the composite color television signal has. The vertical direction filter and the horizontal direction filter therefore perform the following processing to separate the chrominance signal C (m,n) from the signal S (m,n).

The vertical direction filter:
The vertical chrominance signal Cv (m,n)= −¼·{S(m,n−1)−2S(m,n)+S(m,n+1)}
The horizontal direction filter:
The horizontal chrominance signal Ch (m,n)= −¼·{S(m−2,n)−2S(m,n)+S(m+2,n)}
The vertical chrominance signal 56 and the horizontal chrominance signal thus obtained are passed through the compensation delay lines 5e and 5f to the switch circuit 7.

The judgement circuit 10 determines the high band energy with respect to the first sample point (m,n) along the horizontal direction, and the high band energy with respect to the first sample point (m,n) along the vertical direction and causes the switch circuit 7 to select the output of one of the filters which has been found to have a smaller energy.

The high band energy Dh (m,n) along the horizontal direction and the high band energy Dv (m,n) along the vertical direction are given, by absolute value expression:

$$Dh(m,n) = |S(m-2,n) - S(m+2,n)| + k \cdot |S(m-2,n) - 2 \cdot S(m,n) + S(m+2,n)|$$

$$Dv(m,n) = |S(m,n-1) - S(m,n+1)| + k \cdot |S(m,n-1) - 2 \cdot S(m,n) + S(m,n+1)|$$

Here, k is a parameter for determining the separation characteristic and is set at a value within the range of ⅛ to ½. In the judgement circuit of FIG. 4, the parameter k is given by the constant generator 13a.

The values of Dh (m,n) and Dv (m,n) are obtained at the outputs of the adders 6l and 6m, respectively.

Although in principle, one of the sets of the sample points having a smaller high band energy is used for implementing the operation of the filter, a priority or preference factor may be introduced in the selection between the vertical direction filter and the horizontal direction filter. This is implemented by the constant generator 13b. The constant K (which may be positive or negative) on the line 73 is applied to the addition/subtraction circuit 6m where it is added to or subtracted from the horizontal direction high band energy 72. Thus, comparison is made between Dv (m,n)+K (on the line 78) and Dh (m,n) on the line 79.

In other words, the comparator 14 produces a control signal for controlling the switch circuit 7 so that the switching circuit 7 performs the following selection. Namely, If DH (m,n)+K>Dv (m,n), then C (m,n)=Cv (m,n).
If DH (m,n)+K<Dv (m,n), then C (m,n)=Ch (m,n).

The output C (m,n) on the line 61 is used for the determination of the luminance signal output Y (m,n) at the subtractor 6a in accordance with the following equation:

$$Y(m,n) = S(m,n) - C(m,n)$$

As has been described according to the adaptive luminance signal/chrominance signal separation filter of the embodiment described above, four sample points having a color subcarrier of the phase 180° different from the phase of the color subcarrier which the sample point in question has are used to determine in which of the vertical and horizontal directions the waveform variation is smaller, and hence the high band energy, is smaller and the signals in the direction of the smaller waveform variation are used for the separation of the luminance signal and the chrominance signal. Accordingly, the resolution of the resultant picture is improved.

In the embodiment described, the vertical direction filter and the horizontal direction filter are formed of second order digital filters. But the number of the orders may be increased to form a sharp filter.

In the embodiment described, the composite color television signal is sampled at a sample frequency four times the frequency of the color subcarrier in synchronism with the horizontal frequency. But the sampling frequency may be other than four times the frequency of the color subcarrier, provided that it is such a frequency that the sample points are arranged in a grating on the screen.

In the embodiment described, sample points one line above and one line below the sample point in question are used for the evaluation of the waveform variation along the vertical direction, and the sample points two samples before and two samples after the sample point in question are used for the evaluation of the waveform variation along the horizontal direction. But the sample points farther away from the sample point in question may be used instead.

In the embodiment described, one sample point for each of the four directions (over under, left and right) are used. But more than one sample point may be used for each of the four directions.

In the embodiment described, the horizontal and the vertical direction filters for the YC separation and the horizontal and the vertical direction filters for the judgement are provided independently of each other. But a single filter may be used for the two purposes.

As has been described, according to the adaptive luminance signal/chrominance signal separation filter of the embodiment, comparison is made between the high band energy of the composite color television signal along the vertical direction and the high band energy of the composite color television signal along the horizontal direction, and the direction in which the waveform variation is smaller is detected and the series of the signals in the direction of the smaller waveform variation is selected and used for the separation of the luminance signal and the chrominance signal. In this way, a luminance signal/chrominance signal separation filter with reduced cross color disturbance and dot disturbance can be obtained.

Prior Art Detail Extraction Filter

The NTSC video signal S(t) is a composite signal in which the luminance signal Y(t) is combined with a chrominance of signal C(t) obtained by orthogonal phase modulation of a color subcarrier $f_{SC}$ (frequency: 3.579545 MHz) by two color difference signals U(t) and V(t). In symbolic notaion:

$$\begin{aligned} S(t) &= Y(t) + C(t) \\ &= Y(t) + U(t) \sin 2\pi f_{SC} t + V(t) \cos 2\pi f_{SC} t \end{aligned}$$

Prior art systems for detail extraction, whether analog or digital in nature, generally separate the luminance signal Y(t) from the video signal S(t), and then extract the horizontal detail signal from Y(t) by means of a horizontal detail extraction filter, and extract the vertical detail signal by means of a vertical detail extraction filter.

Figure 12:
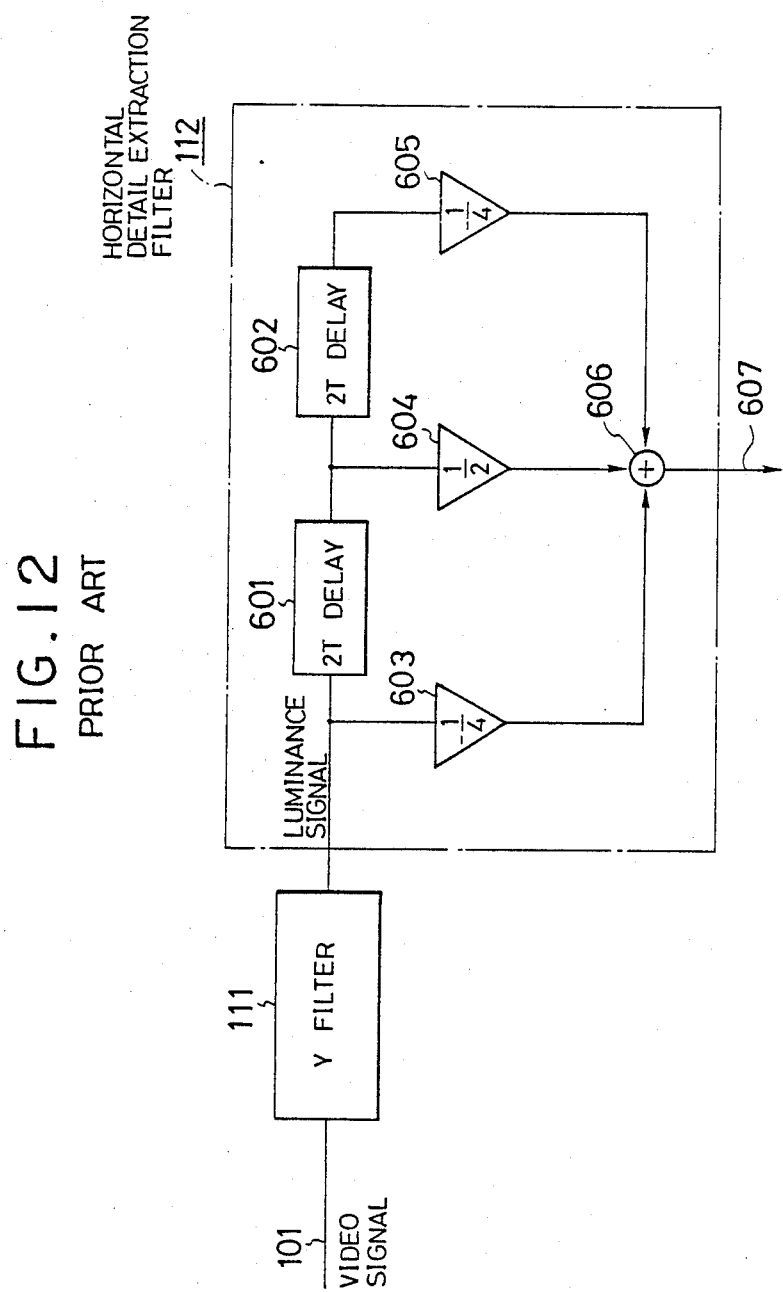
FIG. 12 is a block diagram showing a prior art horizontal detail extraction filter.

FIG. 12 shows a block diagram of a typical prior art horizontal detail extraction filter comprising a Y filter 111 that extracts the luminance signal from the digitized video signal input via line 101, and a horizontal detail extraction filter 112 that receives the luminance signal and extracts from it the horizontal detail component. The detail extraction filter 112 comprises: a 2T delay line 601 that receives the digitized luminance signal from the Y filter 111 and outputs it with a delay of two sampling periods; a 2T delay line 602 that receives the signal from the delay line 601 and outputs it with a further delay of two sampling periods; a x(−¼) scaler 603 that receives the digitized luminance signal from the Y filter 111 and outputs it after multiplication by −¼; a x(½) scaler 604 that receives the output of the 2T delay line 601 and outputs it after multiplication by ½; a x(−¼) scaler 605 that receives the digitized luminance signal from the 2T delay line 602 and outputs it after multiplication by −¼; and an adder 606 that sums the outputs of the scalers 603, 604, and 605 and places the result on the line 607. The operation of this circuit can be described as folllows.

The digitized video signal on the line 101 is supplied to the luminance filter 111, which separates the luminance component and feeds it to the horizontal detail extraction filter 112. Let f(t) be the luminance signal output from the luminance filter 111, and let f(nT) be the value of this signal at the time t=nT (where T is the sampling period). The output of the 2T delay line 601 is then f(nT−2T), and the output of the 2T delay line 602, which delays the output of circuit 601 by a further 2T, is f(nT−4T). The scalers 603, 604, and 605 multiply the outputs of the luminance filter 111, the delay line 601, and the delay line 602 by −¼, ½, and −¼, respectively, so the outputs of these scalers are—f(nT)/4, f(nT−2T)/2, and −f(nT−4T)/4. An adder 606 inputs these three signals and adds them to create the output of the horizontal detail extraction filter 112, which is thus:

$$-(\tfrac{1}{4})\{f(nT)-2f(nT-2T)+f(nT-4T)\}$$

This expression is the second derivative of the luminance signal in the horizontal direction in the picture (the second derivative of the horizontal frequency component). Accordingly, high horizontal luminance frequency components, which mark horizontal details, are extracted in this signal.

Next the configuration and operation of the vertical detail extraction filter are described.

Figure 13:
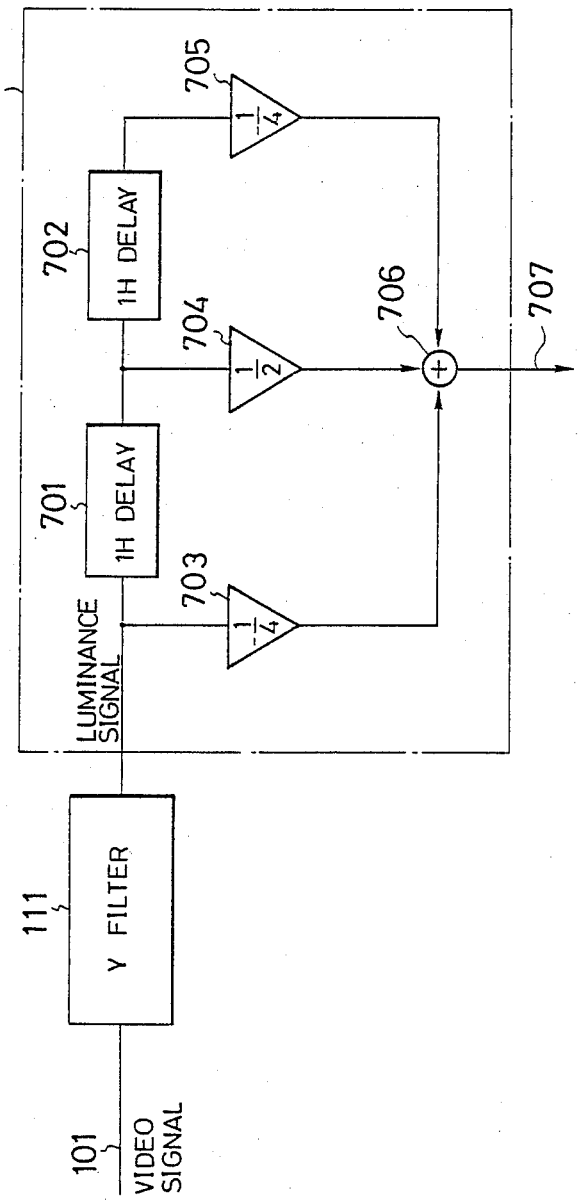
FIG. 13 is a block diagram showing a prior art vertical detail filer.

FIG. 13 shows a block diagram of a typical prior art vertical detail extraction filter, comprising a Y filter 111 that extracts the luminance signal from the digitized video signal input via the line 101, and a vertical detail extraction filter 113 that receives the luminance signal and extracts from it the vertical detail component. The detail extraction filter 113 comprises: a 1H delay line 701 that receives the digitized luminance signal from the Y filter 111 and outputs it with a delay of one horizontal scan period; a 1H delay line 702 that receives the signal from the delay line 701 and outputs it with a further delay of one horizontal scan period; a x(−¼) scaler 703 that receives the luminance signal from the Y filter 111 and outputs it after multiplication by −¼; a x(½) scaler 704 that receives the output of the 1H delay line 701 and outputs it after multiplication by ½; a x(−¼) scaler 705 that receives the digitized luminance signal from the 1H delay circuit 702 and outputs it after multiplication by −¼; and an adder 706 that sums the outputs of the scalers 703, 704, and 705 and places the result on the signal line 707. The operation of this circuit can be described as follows.

The only difference between the vertical detail extraction filter in FIG. 13 and the horizontal detail extraction filter in FIG. 12 is the delay period of their constituent delay lines. The delay lines of the horizontal detail extraction filter delay the signal by two sampling periods, while the dalay lines of the vertical detail extraction filter delay the signal by one horizontal scan. Accordingly, if f(nT) is the signal supplied by the luminance filter 111 at the time t=nT to the vertical detail extraction filter 113, the output of the vertical detail extraction filter 113, by analogy with the horizontal detail extraction filter 112, is:

$$-(\tfrac{1}{4})\{f(nT)-2f(nT-H)+f(nT-2H)\}$$

This expression is the second derivative of the luminance signal in the vertical derection in the picture (the second derivative of the vertical frequency component). Accordingly, high vertical luminance frequency components, which mark vertical details, are extracted in this signal.

Next a filter which extracts both horizontal and vertical details simultaneously is described.

Figure 14:
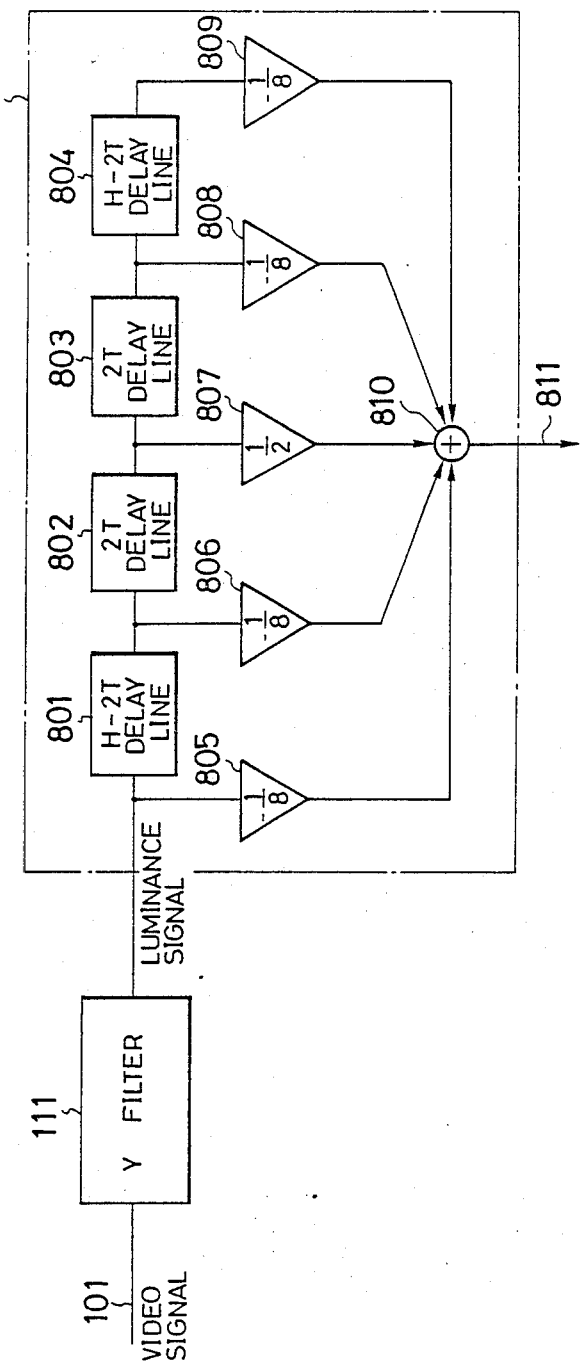
FIG. 14 is a block diagram showing a prior art combined horizontal and vertical detail extraction filter.

FIG. 14 shows the block diagram of a prior art horizontal and vertical detail extraction filter, comprising a Y filter 111 that extracts the luminance signal from the digitized video signal input via the line 101, and a horizontal and vertical detail extraction filter 114 that receives the luminance signal and extracts from it the horizontal and vertical detail components. The detail extraction filter 114 comprises: an H−2T delay line 801 that receives the digitized luminance signal from the Y filter 111 and outputs it with a delay of one horizontal scan period minus two sampling periods; a 2T delay line 802 that receives the signal from the H−2T delay line 801 and outputs it with a further delay of two sampling periods; a 2T delay line 803 that receives the signal from the 2T delay line 802 and outputs it with an additional 2T delay; an H−2T delay line 804 that receives the signal from the 2T delay line 803 and outputs it with a delay of one horizontal scan period minus two sampling periods; a x(−⅛) scaler 805 that receives the luminance signal from the Y filter 111 and outputs it aftrer multiplication by −⅛; a x(−⅛) scaler 806 that receives the output of the H−2T delay line 801 and outputs it after mulitiplication by −⅛; a x(½) scaler 807 that receives the signal from the 2T delay line 802 and outputs it after multiplication by ½; a x(−⅛) scaler 808 that receives the signal from the 2T delay line 803 and outputs it after multiplication by −⅛; a x(−⅛) scaler 809 that receives the signal from the H−2T delay line 804 and outputs it after multiplication by −⅛; and an adder circuit 810 that sums the outputs of the scalers 805, 806, 807, 808, and 809 places the result on the signal line 811. The configuration of this horizontal and vertical details filter 114 is a combination of the horizontal detail filter 112 in FIG. 12 and the vertical detail extraction filter 113 in FIG. 13. The delay lines 802 and 803, the scalers 806, 807, and 808, and the adder 810 form a horizontal detail extraction filter. The delay lines 801 to 804, the scalers 805, 807, and 809, and the adder 810 form a vertical detail extraction filter. This horizontal and vertical detail extraction filter therefore extracts the horizontal detail signal and the vertical detail signal simultaneously.

As we have seen, the prior art detail extraction filters use only components of te luminance signal. This invitably leads to increased cost by requiring separate 1H delay circuits: one to delay the signal by one horizontal scan period in the luminance/chrominance separation circuit that separates the video signal into a luminance signal and chrominance signal and another for the horizontal and vertical detail extraction filter.

Detail Extraction Filter of an Embodiment

FIG. 7 shows the block diagram of an embodiment of this invention in a detail extraction filter. The detail extraction filter embodying this invention in FIG. 7 comprises: a line memory 102 that includes series-connected 1H delay lines for receiving via a line 101 a digitized NTSC video signal sampled at four times the subcarrier frequency $4f_{SC}$ and performing predetermined delay processing; a horizontal detail extraction filter 103 that receives the signal from the line memory 102 and extracts the horizontal detail signal; a vertical detail extraction filter 104 that receives the signal from the line memory 102 and extracts the vertical detail signal; a detail detector circuit 105 that receives the signal from the line memory 102 and detects the direction of detail in the picture; and a switch 109 that, in response to a signal received from the detail detector 105 via the line 108, selectively passes either the horizontal detail signal received via the line 106 or the vertical detail signal received via the line 107.

Figure 8:
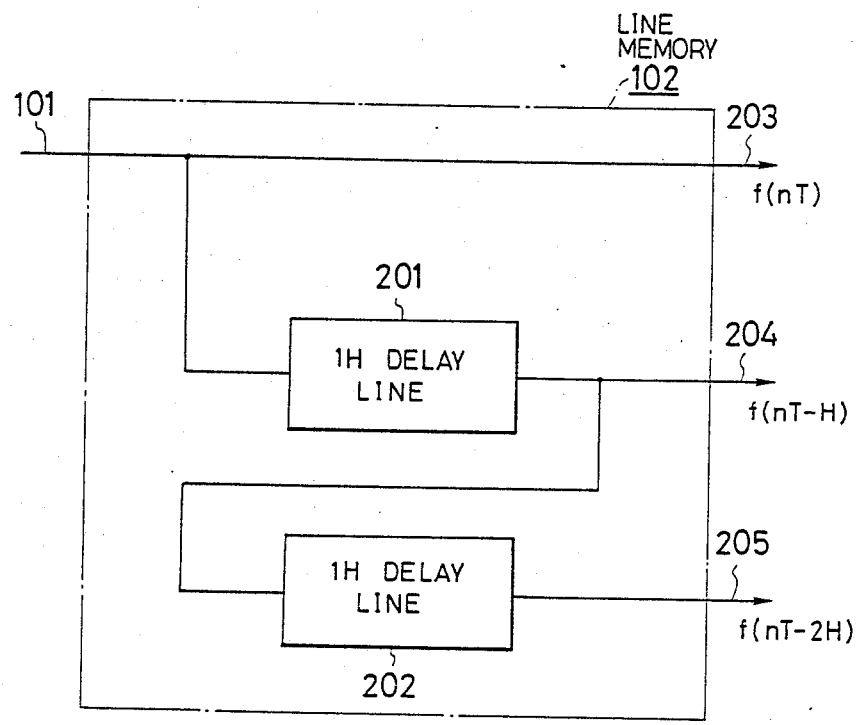
FIG. 8 is a block diagram showing the line memory shown in FIG. 7.

FIG. 8 is a block diagram showing the configuration of the line memory 102. As depicted in FIG. 8 the line memory 102 comprises 1H delay lines 201 and 202 connected in series The 1H delay line 201 receives the given digitized signal via the line 101 and delays it by one horizontal scan period; the 1H delay line 202 receives the signal from the 1H delay line 201 and delays it by one further horizontal scan period. The output signals of the line memory 102 are the undelayed video signal on the line 203, the video signal delayed by one horizontal scan period on the line 204, and the video signal delayed by two horizontal scan periods on the line 205.

Figure 9:
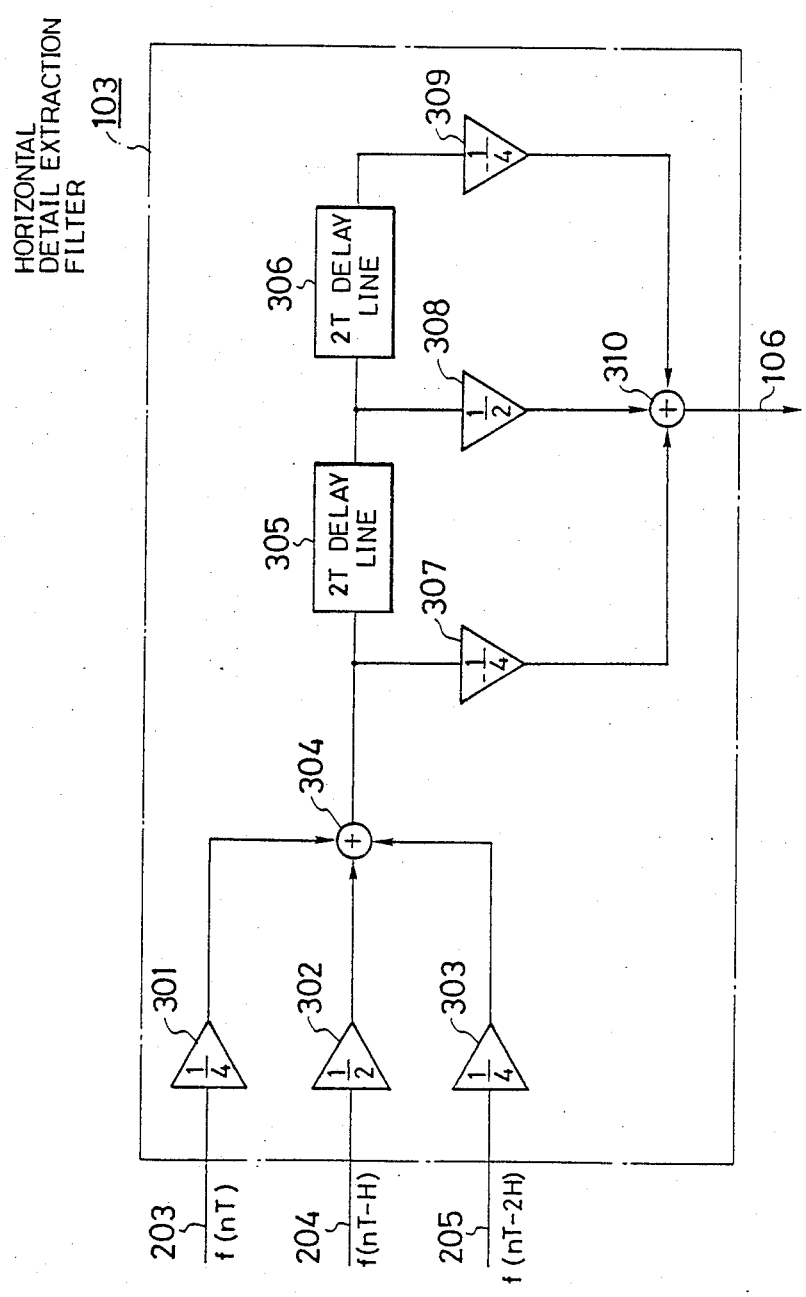
FIG. 9 is a block diagram showing the horizontal detail extraction filter shown in FIG. 7.

FIG. 9 is a block diagram showing the horizontal detail extraction filter in FIG. 7, comprising a low-pass filter for the vertical direction (vertical frequencies) and a high-pass filter for the horizontal direction (horizontal frequencies) connected in series. The vertical low-pass filter comprises: a $x(\frac{1}{4})$ scaler 301 that receives the undelayed video signal via the line 203 and outputs it after multiplication by $\frac{1}{4}$; a $x(\frac{1}{2})$ scaler 302 that receives the video signal delayed by one horizontal scan period via the line 204 and outputs it after multiplication by $\frac{1}{2}$; a $\frac{1}{4}$ scaler 303 that receives the video signal delayed by two horizontal scan periods via the line 205 and outputs it after multiplication by $\frac{1}{4}$; and an adder 304 that receives the outputs of the scalers 301, 302, and 303 and generates their sum. The horizontal high-pass filter comprises: a 2T delay line 305 that receives the output from the adder 304 and outputs it with a delay of two sampling periods; a 2T delay line 306 that receives the output of the 2T delay line 305 and delays it by a further two sampling periods; a $x(-\frac{1}{4})$ scaler 307 that receives the output from the adder 304 and outputs it after multiplication by $-\frac{1}{4}$; a $x(\frac{1}{2})$ scaler 308 that receives the output from the 2T delay line 305 and outputs it after multiplication by $\frac{1}{2}$; a $x(-\frac{1}{4})$ scaler 309 that receives the output from the 2T delay line 306 and outputs it after multiplication by $-\frac{1}{4}$; and an adder 310 that receives the output from the scalers 307, 309, and 309 and outputs their sum on line 106.

Figure 10:
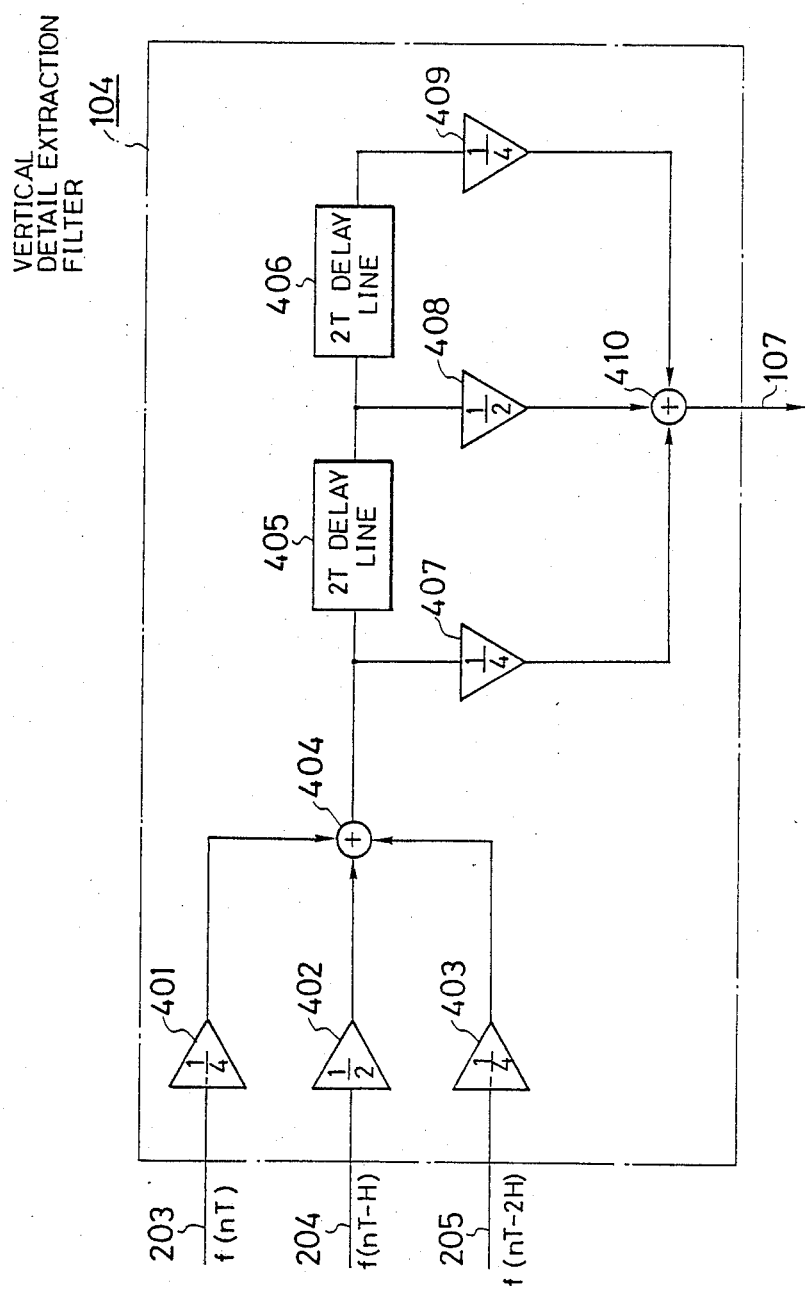
FIG. 10 is a block diagram showing the vertical detail extraction filter shown in FIG. 7.

FIG. 10 is a block diagram of the vertical detail extraction filter in FIG. 7 comprising a high-pass filter for the vertical direction (vertical frequencies) and a low-pass filter for the horizontal direction (horizontal) frequencies) connected in series. The vertical high-pass filter comprises: a $x(-\frac{1}{4})$ scaler 401 that receives the undelayed video signal via the line 203 and outputs it after multiplication by $-\frac{1}{4}$; a $x(\frac{1}{2})$ scaler 402 that receives the video signal delayed by one horizontal scan period via the line 204 and outputs it after multiplication by $\frac{1}{2}$; a $x(-\frac{1}{4})$ scaler 403 that receives the video signal delayed by two horizontal scan periods via the line 205 and outputs it after multiplication by $-\frac{1}{4}$; and an adder 404 that receives the outputs of the scalers 401, 402, and 403 and generates their sum. The horizontal low-pass filter comprises: a 2T delay line 405 that receives the output from the adder 404 and outputs it with a delay of two sampling periods; a 2T delay line 406 that receives the output from the 2T delay line 405 and delays it by a further two sampling periods; a $x(\frac{1}{4})$ scaler 407 that receives the output from the adder 404 and outputs it after multiplication by $\frac{1}{4}$; a $x(\frac{1}{2})$ scaler 408 that receives the output from the 2T delay line 405 and outputs it after multiplication by $\frac{1}{2}$; a $x(\frac{1}{4})$ scaler 409 that receives the output from the 2T delay line 406 and outputs it after multiplication by $\frac{1}{4}$; and an adder 410 that receives the output from the scaler 407, 409, and 409 and outputs their sum on the line 107.

Figure 11:
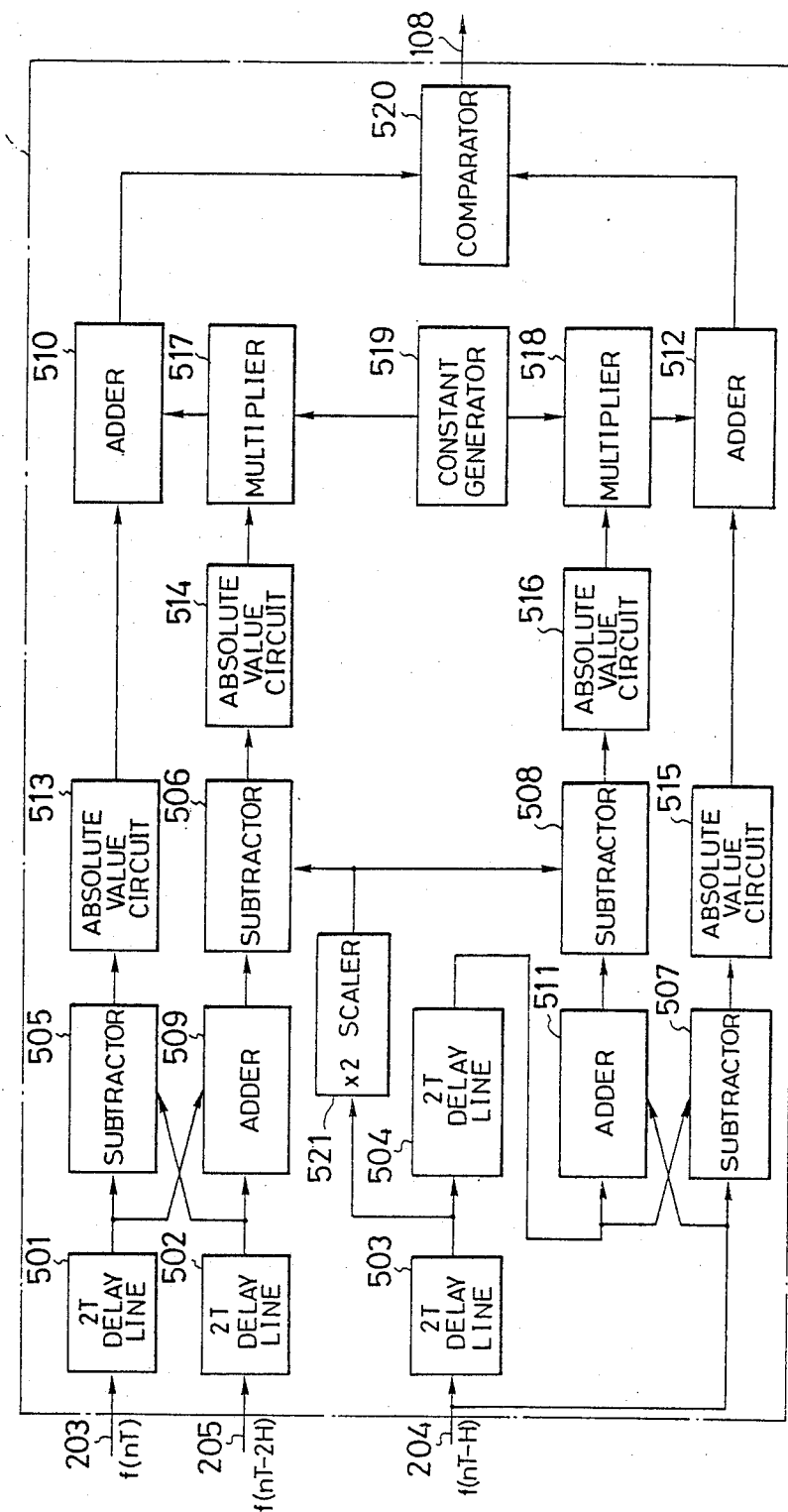
FIG. 11 is a block diagram showing the detail detector circuit shown in FIG. 7.

FIG. 11 shows the configuration of the detail detector, which is divided into two blocks, one detecting horizontal details and the other detecting vertical details.

The vertical details detection block comprises two paths. On one path are; a 2T delay line 501 that receives via the line 203 the undelayed video signal and outputs it with a delay of two sampling periods; a 2T delay line 502 that receives via the line 205 the video signal delayed by two horizontal scan periods and outputs it with an additional delay of two sampling periods; a subtractor 505 that receives the outputs of the 2T delay lines 501 and 502 and outputs their difference; an absolute-value circuit 513 that receives the output of the subtractor 505 and outputs its absolute value; and an adder 510 that receives the output of the absolute-value circuit 513 at its first input. On the other path are: an adder 509 that receives and adds the outputs of the 2T delay lines 501 and 502; a 2T delay line 503 that receives via line 204 the video signal delayed by one horizontal scan period and outputs it with an additional delay of two sampling periods; a x2 scaler 521 that receives the output of the 2T. delay line 503 and multiplies it by 2; a subtractor 506 that receives the output of the adder 509 and the x2 scaler 521 and outputs their difference; an absolute-value circuit 514 that receives the output of the substractor 506 and outputs its absolute value; a multiplier 517 that receives signals from the absolute-value circuit 514 and a constant generator 519 that generates a predetermined constant k, multiplies the output of the absolute-value circuit 514 by the predetermined constant k, and outputs the result; and the aforesaid adder 510, the second input of which is the output of the multiplier circuit 517. The output of the adder 510, which indicates the degree of change in the high-frequency components in the vertical direction in the picture, becomes one of the inputs of the comparator 520.

Next is described the horizontal detail extraction block, which also comprises two paths. On one path are: the 2T delay line 503 that receives via the line 204 the video signal delayed by one horizontal scan period and outputs it with an additional delay of two sampling periods; a 2T delay line 504 that receives the output of the 2T delay line 503 and outputs it with an additional 2T delay; an adder 511 that receives the output of the 2T delay line 504 and the video signal delayed by one horizontal scan period on the line 204 and outputs their sum; the x2 scaler 521 that receives the output of the 2T delay line 503 and outputs it after multiplication by 2; a subtractor 508 that receives the outputs of the scaler 521 and the adder 511 and outputs their difference; an absolute-value circuit 516 that receives the output of the subtractor 508 and outputs its absolute value; a multiplier 518 that receives the outputs of the absolute-value circuit 516 and the constant generator 519, multiplies the output of the absolute-value circuit 516 by the constant k obtained from the constant generator 519, and outputs the result; and an adder 512, the first input of which is the output of the multiplier 518. On the other path are: a subtractor 507 that receives via the line 204 the video signal delayed by one horizontal scan period and the output of the 2T the 2T delay line 504 and outputs their difference; an absolute-value circuit 515 that receives the output of the subtractor 507 and outputs its absolute value; and the aforesaid adder 512, the second input of which is the output of the absolute-value circuit 515. The output of the adder 512, which is the horizontal detail detect signal, forms the other input of the comparator 520. The comparator 520 receives the outputs of the adder circuits 510 and 512, compares their magnitude, and outputs the signal indicative of the result of the comparison, on the line 108 to switch 109 in FIG. 7. The operation of the circuit is described next.

The digital video signal on the line 101 is divided by the line memory 102 among three signal lines. The first of these carries the undelayed video signal f(nT), output on the line 203 from the line memory 102; the second carries the video signal with a delay of one horizontal scan period, denoted f(nT−H), which is generated from f(nT) by the 1H delay line 201 and output on the line 204 from the line memory 102; the third carries the video signal with an additional delay of one horizontal scan period, denoted f(nT−2H), which is generated from f(nT−H) by the 1H delay line 202; where T is the sampling period, n is an integer, and H is the horizontal scan period. In the picture, these three signals are aligned in the vertical direction in the order, from bottom to top, of f(nT), f(nT−H), f(nT−2H).

The scaler 301 in the horizontal detail extraction filter 103 in FIG. 9 scales the f(nT) video signal by a factor of ¼ ad provides the result to the first input of the adder 304. The scaler 302 scales the f(nT−H) signal by a factor of ½ and provides the result to the second input of the adder 304. The scaler 303 scales the f(nT−2H) signal by a factor of ¼ and provides the result to the third input of the adder 304. The adder 304 sums all three of these signal to generate the signal g(nT−H) defined as follow:

$$g(nT-H) = (\tfrac{1}{4})\{f(nT) + 2f(nT-H) + f(nT-2H)\}$$

or $$g(nT) = (\tfrac{1}{4})\{f(nT+H) + 2f(nT) + f(nT-H)\}$$

This is the well-known formula of a comb filter, which has gain 1 when $f = mf_H$ (where f is frequency, m is an integer, and $f_H$ is the horizontal scanning frequency) and gain 0 when $f = (m + \tfrac{1}{2})f_H$, or in terms of the vertical frequency $f_V$ a vertical low-pass filter with gain 1 when $f_V = 0$ and gain 0 when $f_V = 525/4 = 131.25$ (cy/ph). The chrominance component of the NTSC signal is distributed in the vicinity of $f_V = 131.25$ (cy/ph), so this filter rejects the chrominance component almost completely. It follows that the vertical low-frequency component of the luminance component of f(nT) is extracted in the output g(nT) of the adder 304, which contains the horizontal detail component because no restriction is imposed on the horizontal frequencies.

The output of the adder 304 next becomes the input to the 2T delay line 305 that delays it by two sampling periods and the x(−¼) scaler 307. If g(nT) is used as the notation for the output of the adder 304, g(nT−2T) denotes the output of the delay line 305. The delay circuit 306 delays this signal by a further 2T, hence the output of the delay line 306 is denoted g(nT−4T). The scaler 307 provides g(nt) scaled by a factor of −¼ to the adder 310. The scaler 308 provides the adder 310 with the g(nT−2T) signal from the 2T delay line 305 scaled by a factor of ½. The scaler 309 provides the adder 310 with the g(nT−4T) signal from the 2T delay line 306 scaled by a factor of −¼. The adder 310 sums all three of these signals to generate the signal X(nT−H) defined as follows:

$$X(nT-2T) = -(\tfrac{1}{4})\{g(nT) - 2g(nT-2T) + g(nT-4T)\}$$

or $$X(nT) = -(\tfrac{1}{4})\{g(nT+2T) - 2g(nT) + g(nT-2T)\}$$

This is the well-known formula of a high-pass filter which, given a sampling frequency equal to four times the frequency of the color subcarrier, has gain 0 when f = 0 (Hz) and gain 1 when $f = f_{SC}$, (where $f_{SC}$ is the frequency of the color subcarrier). Accordingly, X(nT) is the detail component in the horizontal direction, and is provided as the output of the horizontal detail extraction filter 103 on the output line 106.

Next the extraction of the vertical detail is described. An analysis similar to the preceding one shows that the output h(nT) of the adder 404 in the vertical detail extraction filter 104 in FIG. 10 is:

$$h(nT) = -(\tfrac{1}{4})\{f(nt-H) - 2f(nT) + f(nT+H)\}$$

where $$T = 1/f_{SC}$$

This is the formula of a comb filter that has gain 0 when $f = mf_H$ and gain 1 when $f = (m + \tfrac{1}{2})f_H$, or in terms of the vertical frequency $f_V$ a vertical high-pass filter with gain 0 when $f_V = 0$ and gain 1 when $f_V = 131.25$ (cy/ph). The signal h(nT) accordingly contains the vertical detail component, but it also contains the chrominance component. The delay lines 405 and 406, the scalers 407 to 409, and the adder 410 form a low-pass filter that rejects the chrominance component almost completely, leaving only the vertical detail component. From an analysis analogous to the one given above, the formula defining the output of the adder 410 is:

$$y(nT)=(\tfrac{1}{4})\{h(nT-2T)+h(nT)+h(nT+2T)\}$$

where $$T=1/f_{SC}$$

This is the formula of a low-pass filter with gain 1 when f=0 (Hz) and gain 0 when f=f$_{SC}$, passage through which removes the chrominance component contained in the h(nT) signal. The remaining y(nT) vertical detail component is provided as the output of the vertical detail extraction filter on the output line 107.

In the embodiment described above, the exracted vertical and horizontal detail signals are not combined into a single horizontal-and-vertical detail signal; instead, either the horizontal or vertical detail signal is selected adaptively and output alone. The selection is made according to features of the picture: specifically, according to whether a horizontal or vertical detail ia present in the picture. FIG. 11 shows the detail detector circuit that determines the direction of the detail. The operation of the details detector circuit is explained below with reference to FIG. 11.

The f(nT) and F(nT−2H) video signals are each delayed two sampling periods by the delay lines 501 and 502 and fed to the subtractor 505, which outputs their difference to the absolute-value circuit 513. The absolute-value circuit 513 generates the absolute value of the given signal and outputs the result. The formula of the output of the absolute value circuit 513 is accordingly:

$$|f(nT-2T)-f(nT-2H-2T)|$$

If a delay of 2T+H is ignored, the expression above can be written in the form:

$$|f(nT+H)-f(nT-H)|$$

The output of the delay lines 501 and 502 are also fed to an adder 509 which generates their sum and provides it as one of the inputs of the subtractor 506. The other input of the subtractor 506 is generated from the f(nT−H) video signal by adding a further delay of two sampling perriodes in the delay line 503 and amplifying the result with a gain factor of 2 in the x2 scaler 521. The subtractor 506 generates the difference between its two inputs and feeds this difference to the absolute-value circuit 514, which generates and outputs the absolute value. If a delay of 2T+H is ignored, the formula of the output of the absolute-value circuit 514 can be written as follows:

$$|f(nT+H)-2f(nT)+f(nT-H)|$$

The output of absolute-value circuit 513 forms one input of the adder 510. The other input is the output of the absolute-value circuit 514 after multiplication in the multiplier 517. The multiplier 517 takes a predetermined constant K generated by the constant generator 519 and multiplies it by the output of the absolute-value circuit 514, furnishing the product to the adder 510. The adder 510 receives the outputs of the absolute-value circuit 513 and the multiplier 517 and generates their sum, given by the formula:

$$|f(nT+H)-f(nT-H)|+K|f(nT+H)-2f(nT)+f(-nT-H)|$$

The first term above (between the first pair of absolute-value signs) describes a bandpass filter that extracts the frequency component having one-half the frequency of the color subcarrier frequency in the vertical direction on the screen. When there is no variation (in luminance or chrominance) in the vertical direction in the picture, the value of this term is 0. The second term (between the second pair of absolute-value signs) describes a bandpass filter that extracts the high-frequency component in the vertical direction on the screen, which is the frequency component of the color subcarrier. In this case the chrominance signal component is extructed even if there is no variation in the vertical direction in the picture. The above shows that according to this invention vertical details are detected by combining the outputs of two bandpass filters with different center frequencies in a fixed ratio of 1:k. The addition of the second term above enables high-frequency components of the luminance signal to be detected in the vicinity of the color subcarrier frequency. A fairly small value of k is desirable, k=¼ for example, because as noted above the chrominance component is extracted in the second term even when there is no variation (detail) in the picture. In such a case the constant generator 519 and the multiplier 517 can be implemented with shift registers or the like.

The adder 511 recives as inputs the f(nT−H) video signal via line 204 and the f(nT−H−4T) signal created by the delay lines 503 and 504. The same two signals f(nT−H) and f(nT−H−4T) are also input to the subtractor 507. The subtractor 507 feeds the difference between its two inputs to the absolute-value circuit 515, which generates and outputs the absolute value of this difference. If a delay of 2T+H is ignored, the formula of the output of the absolute-value circuit 515 is:

$$|f(nT-2T)-f(nT+2T)|$$

The output of the adder 511 is fed through the subtractor 508 to the absolute-value circuit 516. The other input of the subtractor 508 is the 2f(nT−H−2T) video signal generated as described earlier. If a delay of 2T+H is ignored, the output of the absolute-value circuit 516 can be written as follows:

$$|f(nT-2T)-2f(nT)+f(nT+2T)|$$

The outputs of the absolute-value circuits 515 and 516 are combined by the multiplier 518, the constant generator 519, and the adder 512 in the same manner as in the direction of vertical detail. The output of the adder 512 is given by:

$$|f(nT-2T)-f(nT+2T)|+k|f(nT-2T)-2f(nT)+fl(nT+2T)|$$

The first term above describes a bandpass filter that extracts the frequency component having one-half the frequency of the color subcarrier frequency in the horizontal direction on the screen. The second term describes a bandpass filter that extracts the frequency component identical to the frequency of the color subcarrier. As in this case of vertical detail detection, horizontal details are detected by combining the outputs of two bandpass filters with different center frequencies in a fixed ratio of 1:k.

The comparator 520 compares the outputs of the two adders 510 and 512 and controls, via the signal line 108, the switch circuit 109 in such a manner that the output of the vertical detail extraction filter 104 is selected to be the detail signal when the signal difference (the output of the adder 510) in the vertical direction is greater than the signal difference (the output of the adder 512) in the horizontal direction, and otherwise the output of the horizontal detail extraction filter 103 is selected as the detail signal, the selected output being fed onto the signal line 110.

The control over the output of the comparator 520 is performed to reduce intrusion of the chrominance signal into the detail compensation signal as explained below. When there is a horizontal detail on the screen (a line running in the vertical direction on the screen), the width of the signal spectrum (of the luminance and chrominance signals) is greater in the horizontal direction than in the vertical direction, which may cause contamination of the output of the vertical detail extraction filter 104 by horizontal high-frequency components of the chrominance signal. When this occurs, however, due to the circuit configuration described above, the output of the horizontal detail extraction filter 103 is selected as detail compensation signal, so high-frequency chrominance components do not intrude in the detail signal. Similarly, when there is a vertical detail on the screen (a line in the horizontal direction on the screen), high-frequency vertical components of the chrominance signal may contaminate the output of the horizontal detail extraction filter 103, but the output of the vertical detail extraction filter 104 is selected by the circuit configuration described above, so again the output detail signal does not contain any chrominance.

The detail extraction filter embodying this invention thus extracts horizontal and vertical detail signals directly from the video signal in an adaptive manner that enables the 1H and 2H delay lines to be shared with the YC separator that separates the luminance and chrominance signals from the video signal. Because the horizontal detail extraction filter and vertical detail extraction filter are switched according to features of the video picture, the output of only one of the two filters being selected at a given time, a detail signal largely free of chrominance contamination can be obtained.

In summary, this embodiment provides an adaptive detail extraction filter comprising a vertical low-pass filter connected in series with a horizontal high-pass filter to extract horizontal details and a vertical high-pass filter connected in series with a horizontal low-pass filter to extract vertical details, these filters being capable of extracting horizontal and vertical detail signals directly from the video signal, and a detector that detects video picture features and controls a switch according to the features detected to select either the horizontal or vertical detail signal, with the results that the 1H and 2H delay lines can be shared with the luminance-chrominance separation circuit, and the selected details signal is largely free of chrominance contamination.

What is claimed is:

1. An adaptive luminance signal/chrominance signal separation filter receiving sample values obtained by sampling a composite video signal at a predetermined sampling frequency in synchronism with a horizontal scanning frequency in such a manner that the corresponding sample points are arranged in a grating on the screen, and digitally separating the luminance signal component and the chrominance signal component, and comprising:

- delay means for delaying the sample values for concurrently producing a sample value corresponding to a first sample point which is being subjected to the separation of the luminance signal and the chrominance signal, sample values corresponding to a second and a third sample points positioned on the same scanning line and at the left of and at the right of the first sample point and being identical in the phase of the color subcarrier and sample values corresponding to a fourth and a fifth sample points positioned over and under the first sample point and being identical in the phase of the color subcarrier, a separation horizontal direction filter for the separation of the luminance signal and the chrominance signal receiving the sample values corresponding to the first sample point and the second and the third sample points, and extracting the frequency component corresponding to the color subcarrier component from the series of the signal values in the horizontal direction on the screen, a separation vertical direction filter for the separation of the luminance signal and the chrominance signal receiving the sample values corresponding to the first sample point and the fourth and fifth sample points, and extracting the frequency component corresponding to the color subcarrier component from the series of the signal values in the vertical direction on the screen, a first judgment horizontal direction filter for receiving the sample values corresponding to the first sample point and the sample values corresponding to the second and third sample points and extracting the frequency component corresponding to the color subcarrier component from the series of the signal values along the horizontal direction on the screen, a first judgement vertical direction filter for receiving the sample value corresponding to the first sample point and the sample values corresponding to the forth and the fifth sample points and extracting the frequency component corresponding to the color subcarrier component from the series of the signal values along the vertical direction on the screen, a second judgement horizontal direction filter for receiving the sample values corresponding to the second and the third sample points and extracting the frequency component corresponding to $\frac{1}{2}$ of the color subcarrier component from the series of the signal values along the horizontal direction on the screen, a second judgement vertical direction filter for receiving the sample values corresponding to the fourth and the fifth sample points and extracting the frequency component corresponding to $\frac{1}{2}$ of the color subcarrier component from the series of the signal values along the vertical direction on the screen, horizontal direction high band energy detecting means for adding, in a predetermined ratio, the outputs of the first and the second judgement horizontal direction filters, thereby to extract a high frequency component along the horizontal direction on the screen, vertical direction high band energy detection means for adding, in a predetermined ratio, the outputs of the first and the second judgement vertical direction filters, thereby to extract a frequency component along the vertical direction on the screen, comparison means for comparing the results of the separation detection by the energy detecting means, a switch circuit for selecting the output of the separation horizontal direction filter, when the comparison means finds that the high frequency component as detected by the horizontal direction high band energy detecting means is smaller than the high frequency component as detected by the vertical direction high band energy detecting means, and for selecting the output of the separation vertical direction filter, when the comparison means finds that the high frequency component as detected by the horizontal direction high band energy detecting means is not smaller than the high frequency component as detected by the vertical direction high band energy detecting means, the selected one of the outputs constituting the chrominance signal component, and an operation circuit for subtracting the output of the switch circuit from the composite video signal to produce the luminance signal component.

2. A filter according to claim 1, wherein one of the horizontal and the vertical direction high band energy detecting means is provided with preference means for giving a preference to one of the high frequency components in the comparison.

3. A filter according to claim 2, wherein the preference means comprises a constant generating means for generating a predetermined constant and means for adding or subtracting the constant to or from the high frequency component from one of the horizontal and the vertical direction high band energy detecting means.

4. A filter according to claim 1, wherein the delay means produces sample values for a single second sample point and for a single third sample point.

5. A filter according to claim 1, wherein the delay means produces sample values for a single fourth sample point and for a single fifth sample point.

6. An adaptive detail extraction filter for extraction by digital means of the detail component of a given NTSC video signal sampled at a predetermined sampling frequency in synchronism with a horizontal scanning frequency in such a manner that the corresponding sample points are arranged in a grating on the screen, the extraction filter comprising:

a line memory including a plurality of delay means for delaying said video signal by one horizontal scan period;

a vertical detail extraction filter for extracting the detail signal in the vertical direction on the screen, said vertical detail extraction filter including a first comb filter receiving the output of said line memory and outputting the high-frequency component in the vertical direction in the picture, and a low-pass filter including a plurality of delay means receiving and delaying the output of said first comb filter by two sampling periods, and outputting the low-frequency component in the horizontal direction on the screen;

a horizontal detail extraction filter for extracting the detail signal in the horizontal direction on the screen, said horizontal detail extraction filter including a second comb filter receiving the output of said line memory and outputting the low-frequency component in the vertical direction on the screen, and a high-pass filter including a plurality of delay means receiving and delaying the output of said second comb filter by two sampling periods, and outputting the high-frequency component in the horizontal direction on the screen;

a detail detector circuit including delay means receiving and delaying the output of said line memory by two sampling period, said detail detector circuit determining the degree of variation in the signal in the horizontal and vertical directions to detect the direction of the profile; and selecting means for selectively passing either the output of said vertical detail extraction filter or the output of said horizontal detail extraction filter in response to the output of said detail detector circuit;

said detail detector circuit comprising for both the horizontal and vertical directions, a first bandpass filter for extracting frequency components corresponding to the color subcarrier frequency, a second bandpass filter for extracting frequency components corresponding to one-half the color subcarrier frequency, and adder means for summing the outputs of the said first and second bandpass filters in a predetermined ratio, said detail detector circuit thereby extracting the degree of variation of the high-frequency componens in said horizontal and vertical directions to detect the direction of the detail.

7. An adaptive detail extraction filter according to claim 6, wherein said first bandpass filter comprises:

first delay means for receiving the undelayed video signal from said line memory and delaying said signal by two sampling periods:

second delay means for receiving from said line memory the video signal delayed by two horizontal scan periods and delaying it further by two sampling periods; and first subtractor means for receiving the outputs of said first and second delay means and outputting the absolute value of their difference.

8. An adaptive detail extraction filter according to claim 6, wherein said second bandpass filter comprises:

second delay means for receiving from said line memory the video signal delayed by two horizontal scan periods and delaying it further by two sampling periods;

first delay means for receiving from said line memory the undelayed video signal and delaying it by two sampling periods;

adder means for receiving the outputs said third and fourth delay means and outputting their sum;

third delay means for receiving from said line memory the video signal delayed by one horizontal scan period and delaying it further by two sampling periods;

a scaler circuit for receiving the output of said fifth delay means and multiplying it by two; and second subtractor means for receiving the outputs of said adder means and said first scaler circuit and outputting the absolute value of their difference.

* * * * *